United States Patent
Leu et al.

(10) Patent No.: US 8,665,616 B2
(45) Date of Patent: Mar. 4, 2014

(54) NEAR ZERO CURRENT-RIPPLE INVERSION OR RECTIFICATION CIRCUITS

(75) Inventors: Ching-Shan Leu, Taipei (TW); Pin-Yu Huang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 157 days.

(21) Appl. No.: 13/472,622

(22) Filed: May 16, 2012

(65) Prior Publication Data

US 2013/0308353 A1 Nov. 21, 2013

(51) Int. Cl.
*H02M 1/12* (2006.01)
*H02M 1/14* (2006.01)
*H02M 3/335* (2006.01)

(52) U.S. Cl.
USPC .................. 363/39; 363/40; 363/16; 363/95; 363/97; 363/131

(58) Field of Classification Search
USPC .............................. 363/39, 40, 16, 95, 97, 131
See application file for complete search history.

(56) References Cited

U.S. PATENT DOCUMENTS

| | | | | | |
|---|---|---|---|---|---|
| 5,523,936 | A | * | 6/1996 | Leu et al. | 363/21.04 |
| 5,640,318 | A | * | 6/1997 | Leu | 363/131 |
| 5,786,990 | A | * | 7/1998 | Marrero | 363/16 |
| 5,883,793 | A | * | 3/1999 | Farrington | 363/16 |
| 6,005,779 | A | * | 12/1999 | Cohen | 363/16 |
| 7,515,439 | B2 | * | 4/2009 | Leu | 363/16 |
| 8,259,469 | B2 | * | 9/2012 | Leu et al. | 363/20 |

* cited by examiner

*Primary Examiner* — Bao Q Vu
(74) *Attorney, Agent, or Firm* — Bacon & Thomas, PLLC

(57) ABSTRACT

The present invention relates to a near zero current-ripple inversion circuit including top and bottom cells, a transformer (T1) comprising primary windings (P1, P2) and a secondary winding (S1), and at least one middle cell connected in series between the top and bottom cells. The top cell comprises two capacitors (C1, C2) and a switch (Q1) each connecting to the middle cell, and an inductor (Lr1) and the primary winding (P1) connected in series between the capacitor (C1) and switch (Q1), wherein the switch (Q1) is connected to the capacitors (C1, C2) respectively. The bottom cell comprises a capacitor (C3) and a switch (Q2) each connecting to the middle cell, and an inductor (Lr2) and the primary winding (P2) connected in series between the capacitor (C3) and switch (Q2), wherein the primary winding (P2) is connected to the middle cell, and the capacitor (C3) and switch (Q2) are connected.

15 Claims, 16 Drawing Sheets

(a)

(b)

(a)

(b)

NEAR ZERO CURRENT-RIPPLE INVERSION OR RECTIFICATION CIRCUITS

FIELD OF THE INVENTION

The present invention relates to power inversion circuits, more particularly to power inversion circuits having near zero input current-ripple with low voltage stress on semiconductor switches, wherein similar topologies may be used to achieve near zero output current-ripple for rectification instead of inversion.

BACKGROUND OF THE INVENTION

In an electrical device, the inversion function provided therein is to convert a DC voltage to an AC voltage. As shown in FIG. 1, a conventional half-bridge circuit is one of an inversion example among several other prior art circuit topologies, wherein a DC input voltage Vin provides a DC input current and is connected in parallel with a series connection of capacitors C1 and C2 and a series connection of switches Q1 and Q2, respectively, and a transformer T1 has a primary winding P1 connected between center nodes of the two series-connected capacitors (C1, C2) and switches (Q1, Q2). Alternative operation of the switches Q1 and Q2 results in the generation of an AC output voltage on a secondary winding S1 of the transformer T1.

Although the conventional half-bridge converter has low voltage stress on semiconductors, it suffers from twice the current ripple on the primary winding P1 due to one-half of the input voltage Vin applied to the primary winding P1 of the transformer T1. As a result, it generates higher di/dt (rate of current change) related electromagnetic interference (EMI) than that of the push-pull and full-bridge topologies.

To reduce input current-ripple with its related di/dt noises, interleaving two identical power converters to perform ripple cancellation is widely used at the cost of complicated circuit implementation. Moreover, the input current-ripple cancellation performance will be lost if the operating duty cycle is less than 0.5.

Therefore, it is desirable to design a half-bridge converter having near zero input current-ripple with minimum components. As shown in FIG. 2 is a circuit disclosed by the same inventor of the present invention. Three waveforms of currents $I_{in}$, $I_{P1}$ and $I_{C1}$ of the half-bridge converter shown in FIG. 1 and FIG. 2 are illustrated in FIG. 3(a) and FIG. 3(b), respectively. Due to the help of the two identical transformer primary windings P1, P2 and the clamping capacitor C3 (as shown in FIG. 2), a near zero input current-ripple is obtained as shown in FIG. 3(b). The current-ripple of the input current $I_{in}$ is significantly reduced in comparison with that shown in FIG. 3(a). Consequently, the di/dt noise is reduced resulting in minimizing the input filter capacitor.

To take the advantage of lower voltage rating switch (MOSFET) accompanied with a lower $R_{DS(on)}$ (i.e. the resistance when MOSFET is turned-on), moreover, another circuit disclosed by the same inventor of the present invention is shown in FIG. 4. Two series-switch pairs Q3-Q1 and Q2-Q4 with respectively clamping diodes Dc1 and Dc2 are used to replace the two switches Q1 and Q2 shown in FIG. 2. Due to the turning on of the clamping diodes Dc1 and Dc2, the voltage on each switch is thus limited to one half of the input voltage Vin. Therefore, lower voltage rating switches can be used and the conduction losses are thus reduced. As a result, the efficiency of the converter is improved.

However, the clamping function is achieved only if a special control timing of each driver signal $V_{GS1}$, $V_{GS3}$, $V_{GS2}$ or $V_{GS4}$ (as shown in FIG. 4(b)) is provided by a control circuit (not shown) and the turn-off delay between $V_{GS1}$-$V_{GS3}$ or $V_{GS2}$-$V_{GS4}$ is required. As a result, it increases the complexity of the control circuit.

In addition to having near zero current-ripple performance, the present invention is directed to disclose inversion circuits and their corresponding rectification circuits with additional enhanced performances accordingly.

SUMMARY OF THE INVENTION

An object of the present invention is to provide a switching mode power converter having an inversion or rectification circuit with near zero input or output current-ripple.

Another object of the present invention is to provide a switching mode power converter having an inversion or rectification circuit with leakage inductance and capacitor being a lossless snubber circuit for recycling the leakage energy. Consequently, the converter's efficiency can be improved.

Another object of the present invention is to provide a switching mode power converter having an inversion or rectification circuit with simple control timing of driver signals provided by a control circuit.

A further object of the present invention is to provide a switching mode power converter having an inversion or rectification circuit with low voltage rating semiconductor switches (MOSFETs) accompanied with lower RDS(on) or rectifier diodes having lower forward voltage drop resulting in reducing the conduction losses. Consequently, further efficiency improvements can be achieved.

Other objects, advantages, and novel features of the invention will become more apparent from the following detailed description when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
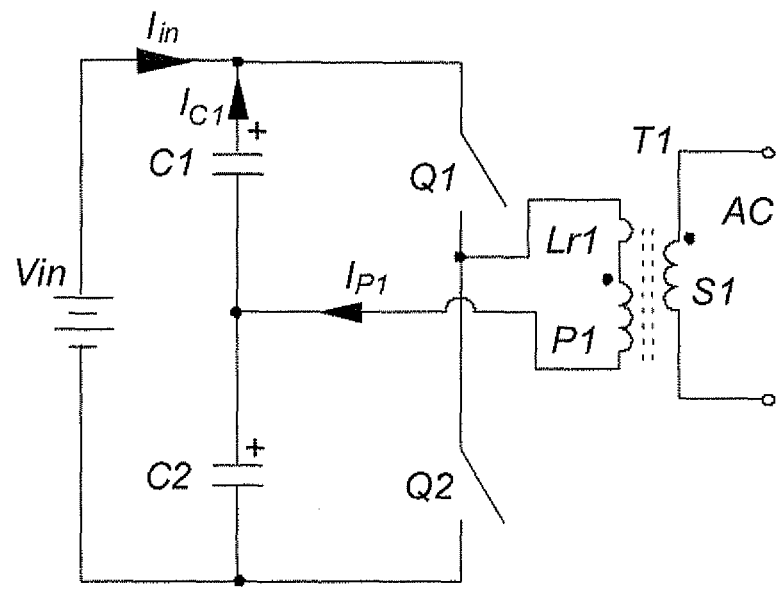
FIG. 1 is a circuit diagram of a conventional half-bridge power converter as a prior art of the present invention.
Figure 2:
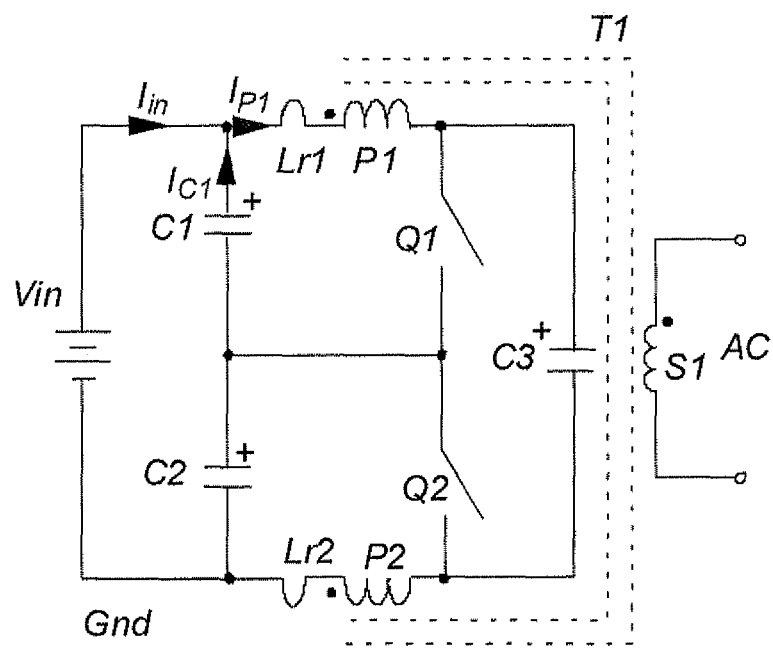
FIG. 2 is a circuit diagram of another half-bridge power converter as a prior art of the present invention.
Figure 3:
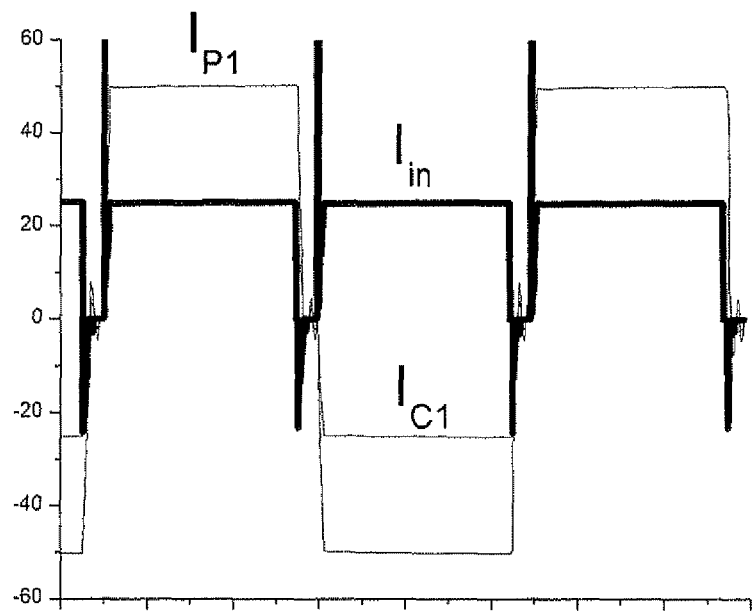
FIG. 3(a) and FIG. 3(b) are three current waveforms of the half-bridge converter in the prior art shown in FIG. 1 and FIG. 2, respectively.
Figure 3:
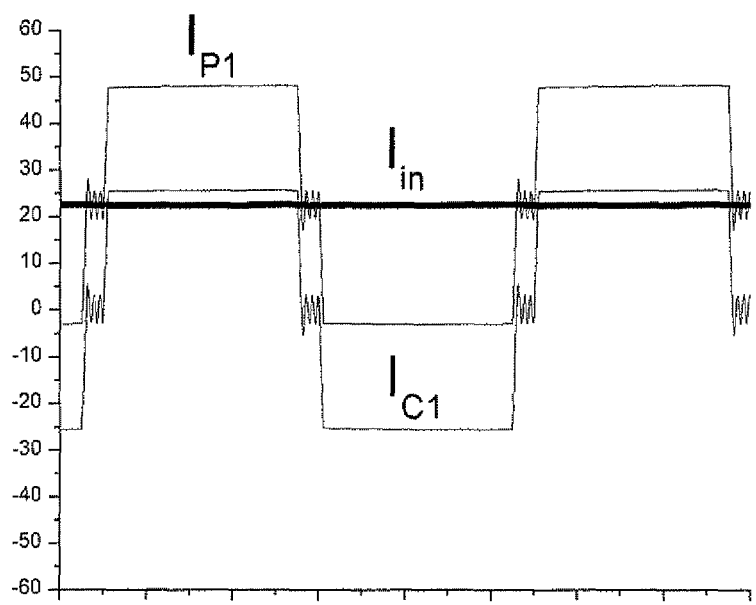
Figure 4:
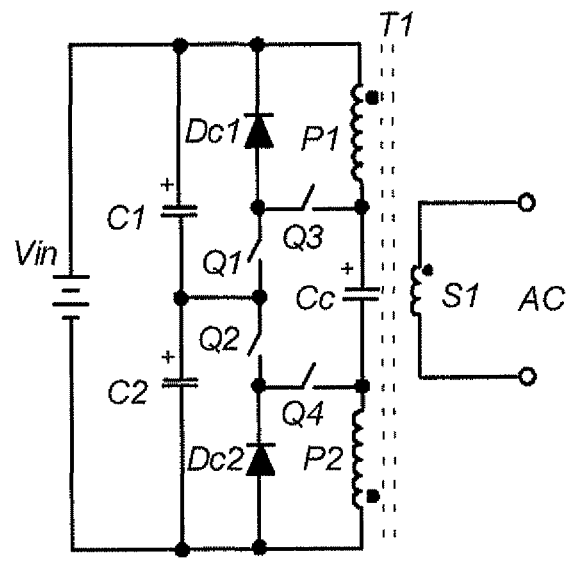
FIG. 4(a) and FIG. 4(b) are a circuit diagram of a low voltage stress half-bridge power converter along with a timing diagram of drive signals as a prior art of the present invention.
Figure 4:
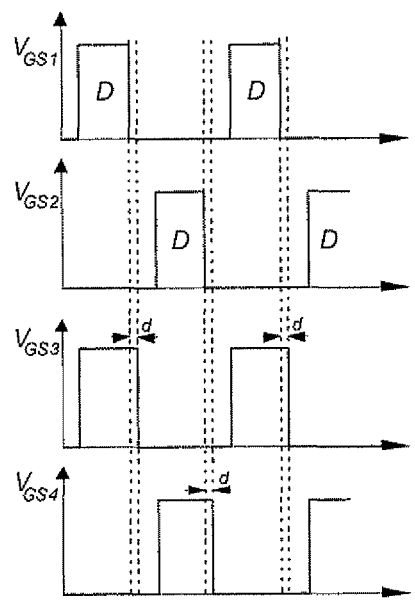

To achieve the foregoing objectives, a power inversion circuit 100 as a first embodiment of the present invention is used to convert DC voltage Vin received at a DC input to AC voltage as illustrated in FIG. 5(a). The inversion circuit 100 is paralleled-connected with the DC input voltage source Vin and comprises one top-cell (having four terminals labeled as In, 1, 2 and 3), several middle-cells (wherein nth middle-cell is labeled as Cell-n and has six terminals labeled as n1, n2, n3, n4, n5 and n6) and one bottom-cell (having four terminals labeled as GND, 4, 5 and 6) series-connected sequentially.

As shown in FIG. 5(a), the top-cell comprises two clamping capacitors C1 and C2, one inductor Lr1, a first primary winding P1 and one switch Q1, wherein the inductor Lr1 represents the leakage inductance of the first primary winding P1 or an external inductor. The terminal In of the top-cell is connected to a positive node of the input voltage Vin, a first node of the clamping capacitor C1 and a first node of the inductor Lr1 are connected to the terminal In. A second node of the inductor Lr1 is connected to a dot node of the first primary winding P1 while an un-dotted node of the first primary winding P1 is connected to a top node of the switch Q1 and a first node of the clamping capacitor C2. A second node (i.e. the terminal 1) of the clamping capacitor C1 and a bottom node (i.e. the terminal 2) of the switch Q1 are connected together. The terminals 1 and 2 are also connected to terminals 11 and 12 of a first middle-cell Cell-1, respectively. A second node (i.e. the terminal 3) of the clamping capacitor C2 is connected to terminal 13 of the first middle-cell Cell-1.

The bottom-cell comprises one clamping capacitor C3, one inductor Lr2, a second primary winding P2, and one switch Q2, wherein the inductor Lr2 represents the leakage inductance of the second primary winding P2 or an external inductor. The terminal GND of the bottom-cell is connected to a negative node of the input voltage Vin. A second node of the clamping capacitor C3 and a first node of the inductor Lr2 are connected to the terminal GND. A second node of the inductor Lr2 is connected to a dot node of the second primary winding P2 while an un-dotted node of the second primary winding P2 is connected to a bottom node of the switch Q2 and the terminal 6. A first node (i.e. the terminal 4) of the clamping capacitor C3 and the top node (i.e. the terminal 5) of the switch Q2 are connected together. The terminals 4, 5 and 6 are connected to terminals x4, x5 and x6 of a last middle-cell Cell-x, respectively.

As shown in FIG. 5(a), several middle-cells Cell-1~Cell-x can be connected in series between the top-cell and the bottom-cell to reduce the voltage stress on switches. As referring to FIG. 5(b), the nth middle-cell Cell-n is realized by two clamping capacitors C4n and C5n, and two switches Q3n and Q4n. Terminals n1 and n2 of the nth middle-cell Cell-n are connected to a first node of the clamping capacitor C4n and a top node of the switch Q4n, respectively. Terminal n3 of the nth middle-cell Cell-n is connected to a bottom node of the switch Q4n, a top node of the switch Q3n, and a first node of the clamping capacitor C5n. Terminals n4, n5 and n6 of the nth middle-cell Cell-n are connected to a second node of the clamping capacitor C4n, a bottom node of the switch Q3n, and a second node of the clamping capacitor C5n, respectively.

The terminals n1, n2, and n3 of the nth middle-cell Cell-n are connected to terminals (n−1)4, (n−1)5 and (n−1)6 of a previous middle-cell Cell-(n−1), respectively. Moreover, the terminals n4, n5, and n6 of the nth middle-cell Cell-n are connected to terminals (n+1)1, (n+1)2, (n+1)3 of a next middle-cell Cell-(n+1), respectively. If two or more middle-cells are connected in series between the top-cell and bottom-cell, the terminals n4 and n5 of the nth middle-cell Cell-n are connected together except terminals x4 and x5 of the last middle-cell Cell-x.

As shown, a transformer T1 provided in the power inversion circuit 100 includes the two primary windings P1 and P2 each having identical turns, and at least one secondary winding S1. The inductors Lr1 and Lr2 represent the leakage inductance of the two primary windings P1 and P2 or two separate inductors or a two-winding couple inductor.

Two sets of alternative drive signals $V_{GS1}$-$V_{GS3n}$ and $V_{GS2}$-$V_{GS4n}$ are issued by a controller (not shown) to turn on or turn off the switches Q1-Q3n and Q2-Q4n within one switching cycle as shown in FIG. 5(c). Consequently, an AC output voltage is generated in the secondary winding S1. If a DC output voltage is required to a load, additional rectified and filtered stages (not shown) are needed.

Figure 5:
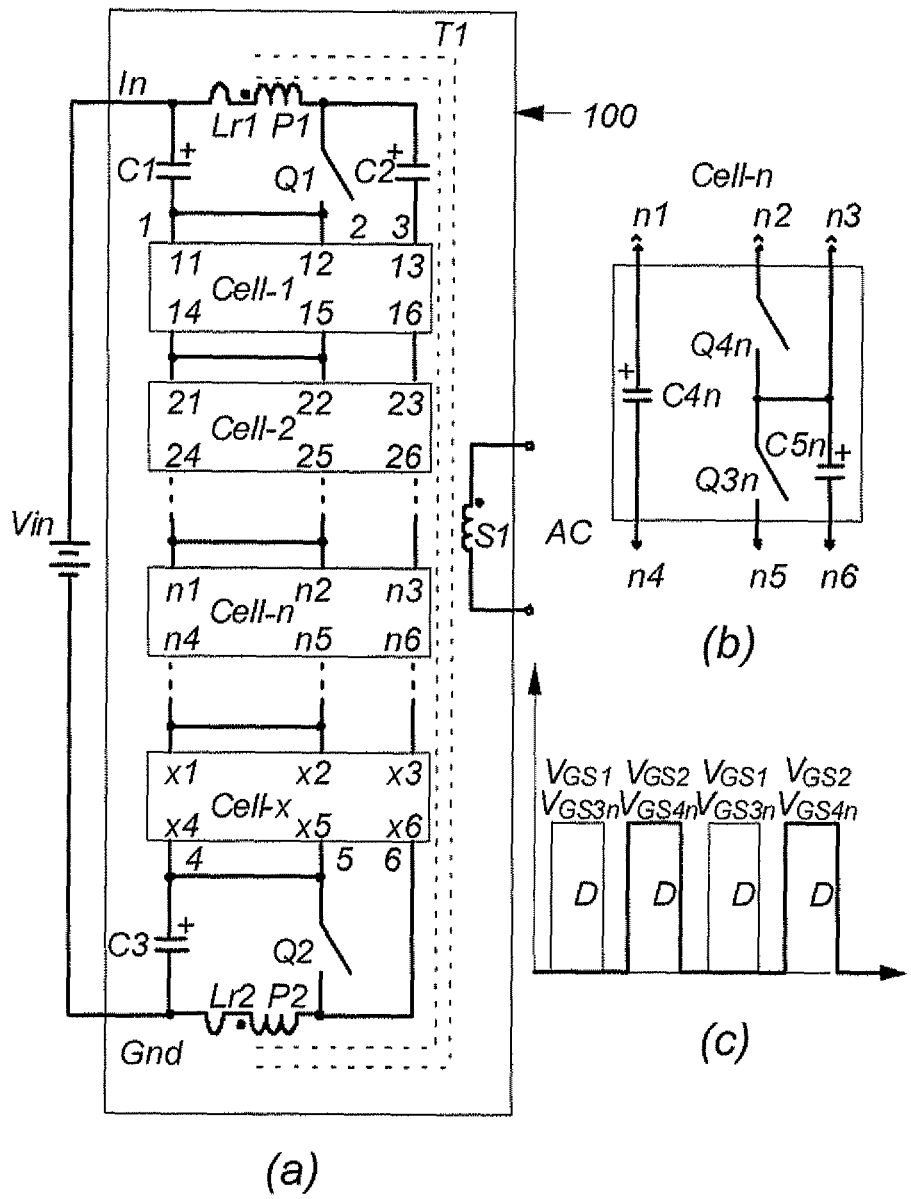
FIG. 5(a), FIG. 5(b) and FIG. 5(c) show a DC-AC inversion circuit, a sub-circuit of a nth middle-cell Cell-n, and drive signals applied thereto according to a first embodiment of the present invention.
Figure 6:
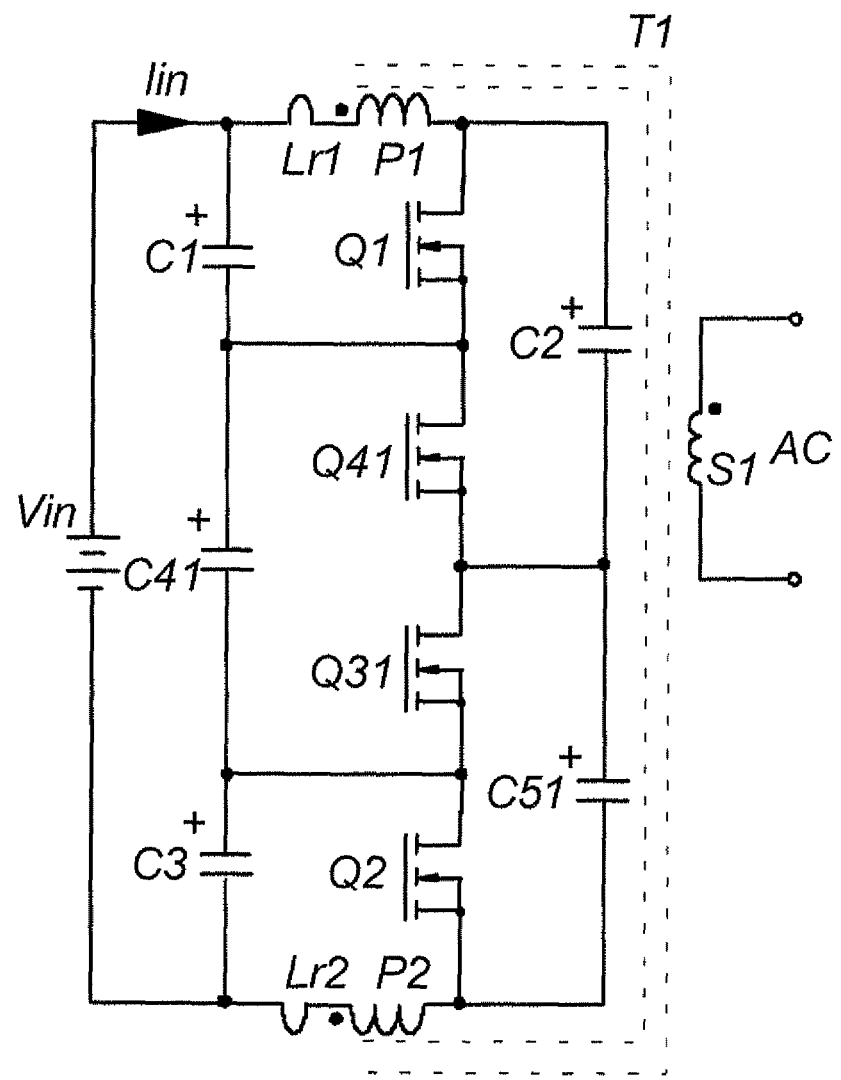
FIG. 6 is a circuit diagram showing an example of the DC-AC inversion circuit shown in FIG. 5(a) wherein the circuit is realized with one middle-cell.
Figure 7:
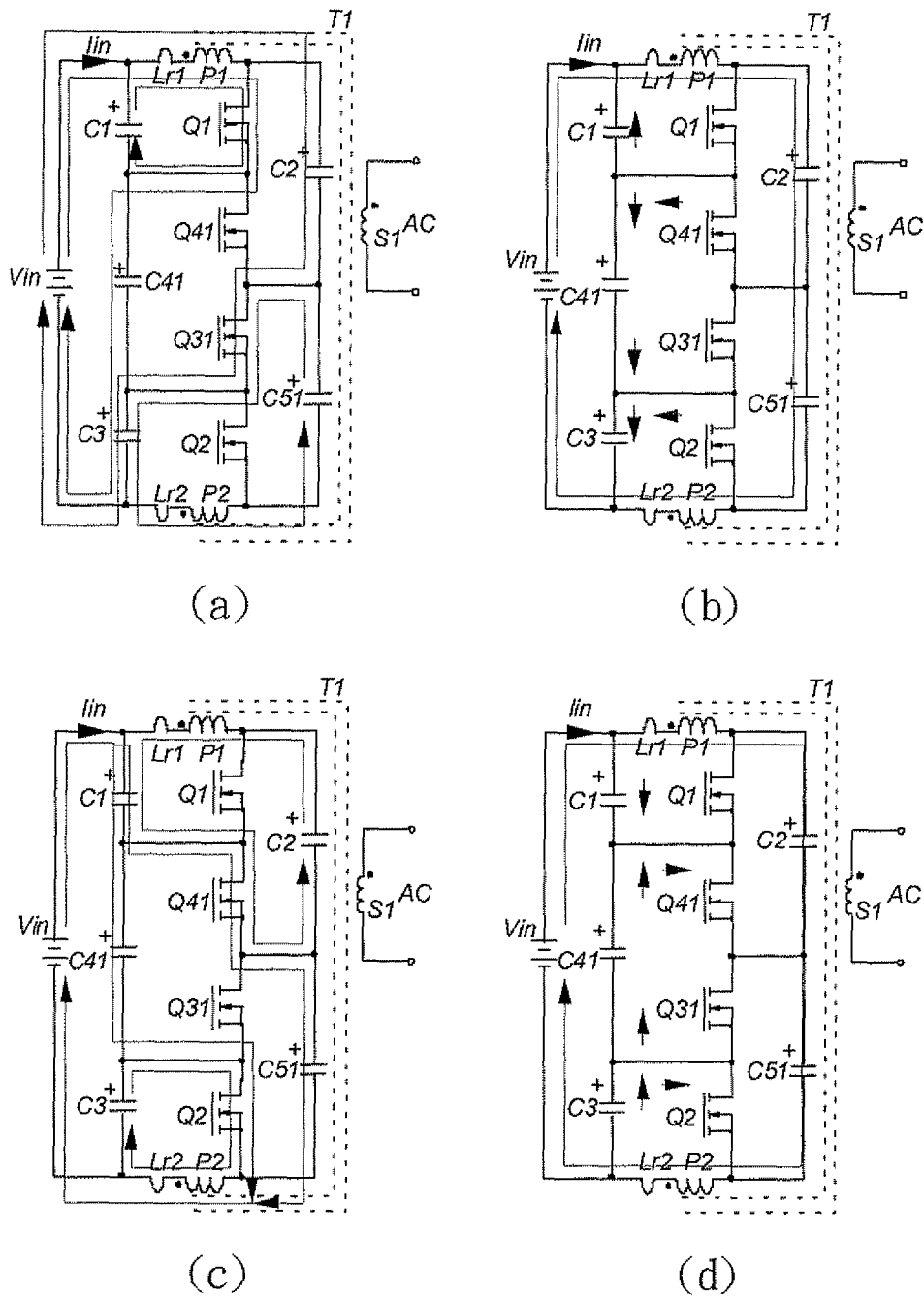
FIG. 7 shows an equivalent circuit of the DC-AC inversion circuit shown in FIG. 6 when the switches are turned on and turned off, respectively.

In accordance with the present invention, power inversion circuit of an application example of the first embodiment and its operating stages are illustrated as shown in FIG. 6 and FIG. 7(a)~7(d), respectively. The power inversion circuit is constructed with only one moddle-Cell, and MOSFETs Q1, Q2, Q41 and Q31 shown in FIG. 6 and FIG. 7 are used as switches equivalent to the switches Q1, Q2, Q4n, and Q3n (i.e. n=1) shown in FIG. 5. When it is assumed that the clamping capacitors C1 and C3 are identical, the voltages across the clamping capacitors C1 and C3 are equal to one-half DC input voltage Vin. Thus, as shown in FIG. 7(a) to FIG. 7(d), there are four operation stages within one switching cycle during steady-state operation.

As shown in FIG. 7(a), gate drive signals are issued to turn on the MOSFET Q1 and Q31 during a first time interval. Four one-quarter input voltages are provided to the first and second primary windings P1 and P2 via the following routes labeled by the marks of the elements thereof sequentially:
(1) Vin(+)-Lr1-P1-Q1-C41-C3-Vin(−);
(2) Vin(+)-Lr1-P1-C2-Q31-C3-Vin(−);
(3) C1(+)-Lr1-P1-Q1-C1(−); and
(4) C51(+)-Q31-C3-Lr2-P2-C51(−),
wherein the clamping capacitor C1 and clamping capacitor C51 are discharged while the capacitor C2, C3 and C41 are charged during the first time interval.

As shown in FIG. 7(b), the gate drive signals are issued to turn off the MOSFETs Q1 and Q31 during a second time interval. The clamping capacitors C2 and C51 are charged by the input voltage Vin, and the energies are stored in the leakage inductances of the transformer T1. Due to the opposite polarities of the two primary windings P1 and P2, the voltages across the first and second primary windings P1 and P2 are cancelled each other and the voltages across the clamping capacitors C2 and C51 (assumed C2=C51) are equal to one-half of the input voltage Vin. Due to the leakage energies being absorbed, the voltage waveforms of the MOSFET Q1 and Q31 have no voltage spike and their voltage stresses are limited to one-half of the input voltage Vin. The average voltages across C2, C51 and C41 are equal to one-half DC input voltage, and the average voltages across C1 and C3 are equal to one-quarter DC input voltage.

As shown in FIG. 7(c), gate drive signals are issued to turn on the MOSFETs Q2 and Q41 during a third time interval. Four one-half of input voltages are provided to the first and second primary windings P1 and P2 via the following routes labeled by the marks of the elements thereof sequentially:
(1) Vin(+)-C1-Q41-C51-P2-Lr2-Vin(−);
(2) Vin(+)-C1-C41-Q2-P2-Lr2-Vin(−);
(3) C3(+)-Q2-P2-Lr2-C3(−); and
(4) C2(+)-P1-Lr1-C1-Q41-C2(−),
wherein the clamping capacitors C2 and C3 are discharged while the capacitors C1, C41, and C51 are charged during the third time interval.

As shown in FIG. 7(d), the gate drive signals are issued to turn off the second MOSFETs Q2 and Q41. The clamping capacitors C2 and C51 are charged by the input voltage Vin, and the energies are stored in the leakage inductances of the transformer T1. Due to the opposite polarities of the two primary windings P1 and P2, the voltages across the first and second primary windings P1 and P2 are cancelled each other and the voltages across the clamping capacitors C2 and C51 (assumed C2=C51) are equal to one-half of the input voltage Vin. Due to the leakage energies being absorbed, the voltage waveforms of the MOSFETs Q2 and Q41 have no voltage spike and their voltage stress are limited to one-half of the input voltage Vin. The average voltages across C2, C51 and C41 are equal to one-half DC input voltage, and the average voltages across C1 and C3 are equal to one-quarter DC input voltage.

As an enhancement of the embodiment, the switches installed in the power inversion circuit 100 shown in FIG. 5 may be other active semiconductor switches other than the MOSFETs Q1, Q2, Q31 and Q41 mentioned above.

In accordance with the present invention, a power inversion circuit 200 of a second embodiment of the present invention is shown in FIG. 8(a). The power inversion circuit 200 is paralleled-connected with the DC input voltage source Vin and comprises one top-cell (having four terminals labeled as In, 1, 2, and 3), several middle-cells (wherein nth middle-cell is labeled as Cell-n shown in FIG. 8(b) and has six terminals labeled as n1, n2, n3, n4, n5 and n6) and one bottom-cell (having four terminals labeled as GND, 4, 5, and 6) series-connected sequentially. Circuits of the top-cell, middle-cell and bottom-cell of the power inversion circuit 200 of the second embodiment and the connection relationships therebetween are almost the same as those of the power inversion circuit 100 of the first embodiment shown in FIG. 5, except that, in the power inversion circuit 200, the second node (i.e. the terminal 1) of the clamping capacitor C1 and the bottom node (i.e. the terminal 2) of the switch Q1 are connected together through a capacitor C6, and the first node (i.e. the terminal 4) of the clamping capacitor C3 and the top node (i.e. the terminal 5) of the switch Q2 are connected together through a capacitor C7.

Two driver-signal sets $V_{GS1}$ and $V_{GS2}$ (or $V_{GS3n}$ and $V_{GS4n}$) complementary to each other with a small dead-time therebetween are issued to turn on or turn off the switches Q1-Q3n (on time: D) and Q2-Q4n (on time: 1-D) within one switching cycle as shown in FIG. 8(c). Consequently, an AC output voltage is generated in the secondary winding S1. If a DC output voltage is required to a load, additional rectified and filtered stages (not shown) are needed.

Figure 8:
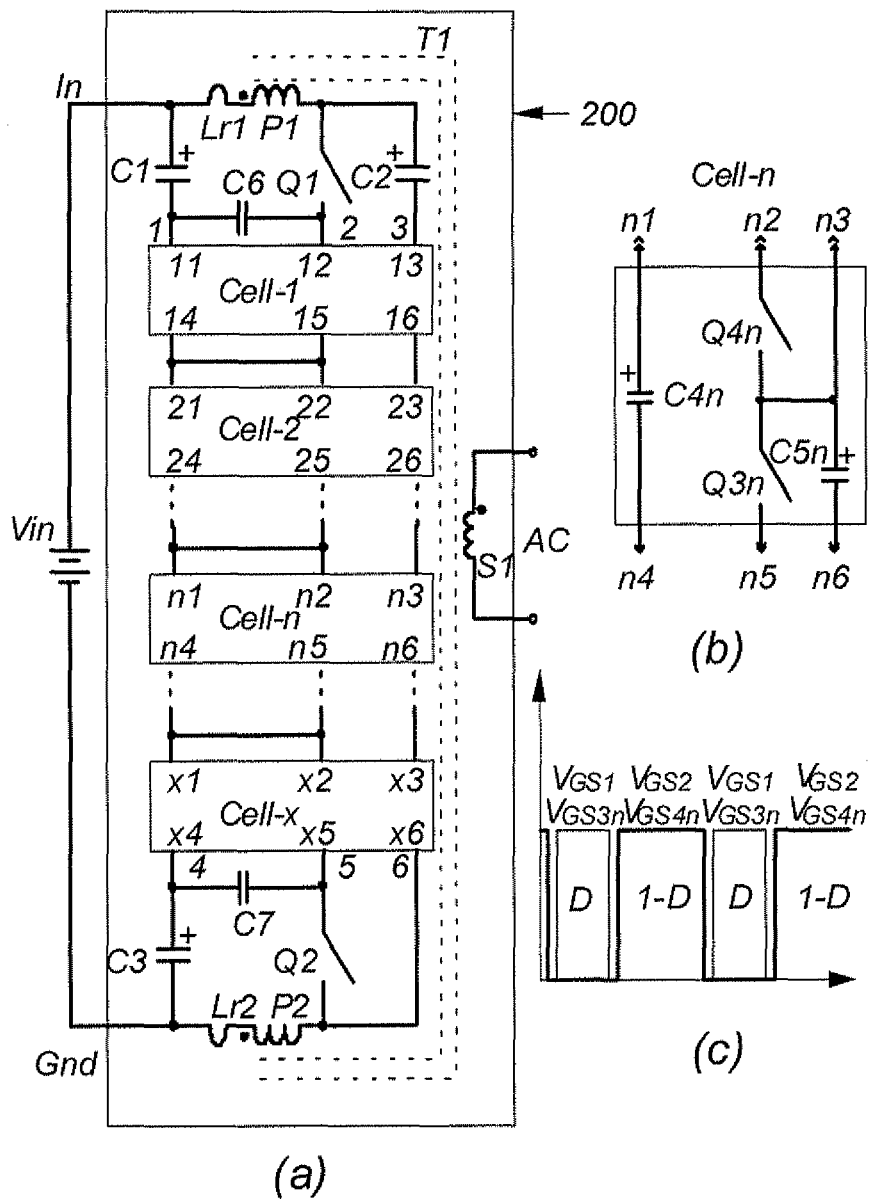
FIG. 8(a), FIG. 8(b), and FIG. 8(c) show a DC-AC inversion circuit, a sub-circuit of a nth middle-cell Cell-n, and drive signals applied thereto according to a second embodiment of the present invention.
Figure 9:
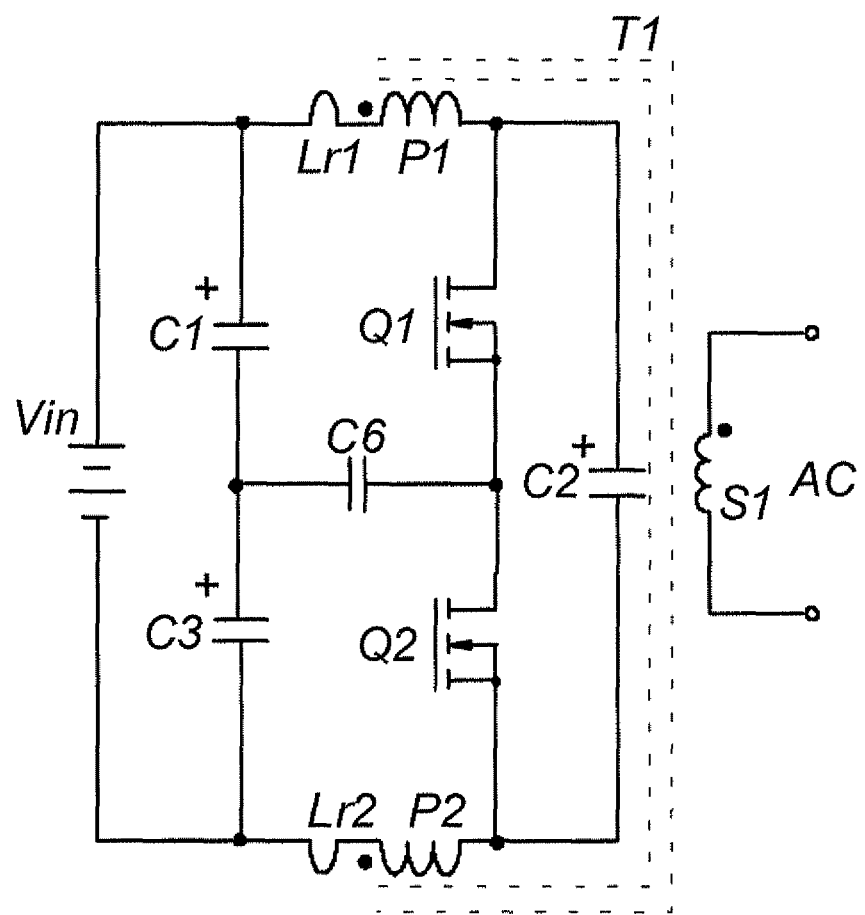
FIG. 9 is a circuit diagram showing an example of the DC-AC inversion circuit shown in FIG. 8(a) wherein the circuit is realized without middle-cell.
Figure 10:
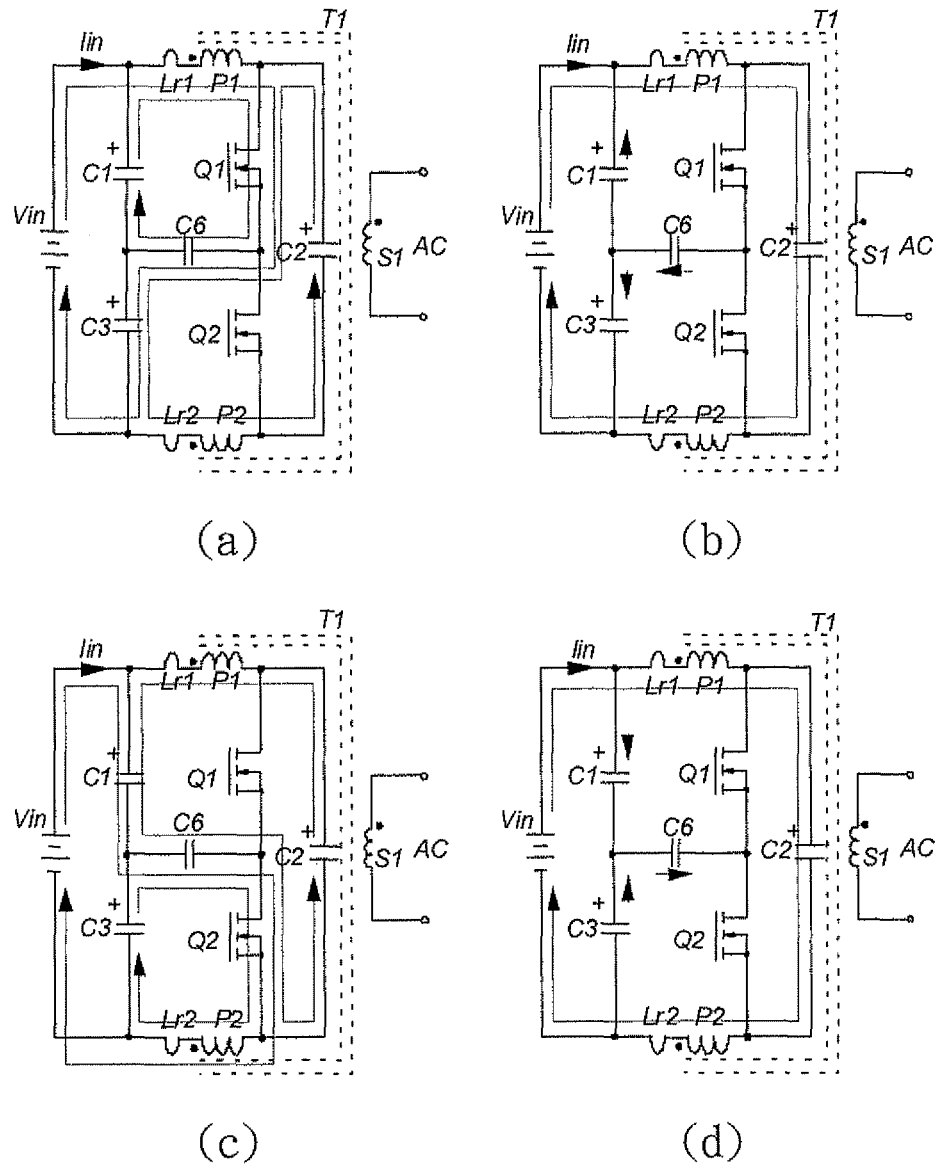
FIG. 10 shows an equivalent circuit of the DC-AC inversion circuit shown in FIG. 9 when the switches are turned on and turned off, respectively.

As an application example of the second embodiment, the power inversion circuit 200 can be constructed without having middle-cell as shown in FIG. 9 and FIG. 10. MOSFETs Q1 and Q2 shown in FIG. 9 and FIG. 10 are equivalent to the switches Q1 and Q2 shown in FIG. 8. When it is assumed that the clamping capacitors C1 and C3 are identical, the voltages across the input capacitors C1 and C3 are equal to one-half DC input voltage Via. Thus, as shown in FIG. 10(a) to FIG. 10(d), there are four operation stages within one switching cycle during steady-state operation.

As shown in FIG. 10(a), gate drive signal is issued to turn on the MOSFET Q1 during a first time interval. Voltages (calculated as one half of input voltage minus voltage across the capacitor C6) are provided to the first and second primary windings P1 and P2 via the following routes labeled by the marks of the elements thereof sequentially:
(1) Vin(+)-Lr1-P1-Q1-C6-C3-Vin(−);
(2) C1(+)-Lr1-P1-Q1-C6-C1(−); and
(3) C2(+)-Q1-C6-C3-Lr2-P2-C2(−),
wherein the clamping capacitors C1 and C2 are discharged while the capacitor C3 and C6 are charged during the first time interval.

As shown in FIG. 10(b), the gate drive signal is issued to turn off the MOSFET Q1 during a second time interval. The clamping capacitor C2 is charged by the input voltage Vin, and the energies are stored in the leakage inductances of the transformer T1. Due to the opposite polarities of the two primary windings P1 and P2, the voltages across the first and second primary windings P1 and P2 are cancelled each other and the voltage across the clamping capacitor C2 is equal to the input voltage Vin. Due to the leakage energies being absorbed, the voltage waveform of MOSFET Q1 has no voltage spike and their voltage stress are limited to one-half of the input voltage Vin. The average voltage across C2 is equal to the input voltage, and the average voltages across C1 and C3 are equal to one-half input voltage.

As shown in FIG. 10(c), the gate drive signal is issued to turn on the MOSFET Q2 during a third time interval. Voltages (calculated as one half of input voltage plus voltage across the capacitor C6) are provided to the first and second primary windings P1 and P2 via the following routes labeled by the marks of the elements thereof sequentially:
(1) C2(+)-P1-Lr1-C1-C6-Q2-C2(−);
(2) Vin(+)-C1-C6-Q2-P2-Lr2-Vin(−); and
(3) C3(+)-C6-Q2-P2-Lr2-C3(−),
wherein the input capacitor C1 is charged while the capacitor C3, C2 and C6 are discharged during the third time interval.

As shown in FIG. 10(d), the gate drive signal is issued to turn off the MOSFET Q2. The clamping capacitor C2 is charged by the input voltage Vin, and the energies are stored in the leakage inductances of the transformer T1. Due to the opposite polarities of the first and second primary windings P1 and P2, the voltage across the first and second primary windings P1 and P2 are cancelled each other and the voltage across the clamping capacitor C2 is equal to input voltage Vin. Due to the leakage energies being absorbed, the voltage waveform of MOSFET Q2 has no voltage spike and their voltage stresses are limited to the input voltage Vin. The average voltage across C2 is equal to the input voltage, and the average voltages across C1 and C3 are equal to one-half input voltage.

As an enhancement of the embodiment, the switches installed in the power inversion circuit of the present invention may be other active semiconductor switches other than the MOSFETs Q1 and Q2 mentioned above.

Figure 11:
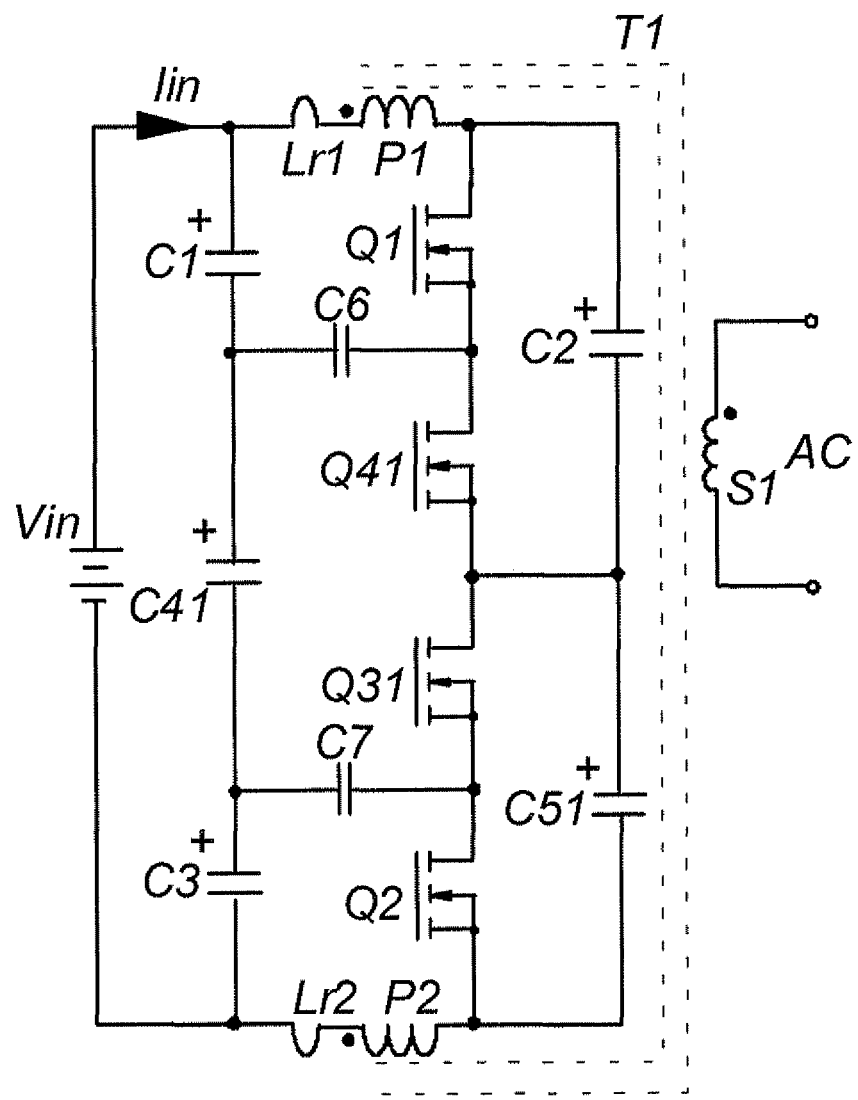
FIG. 11 is a circuit diagram showing another example of the DC-AC inversion circuit shown in FIG. 8(a), wherein the circuit is realized with one middle-cell.
Figure 12:
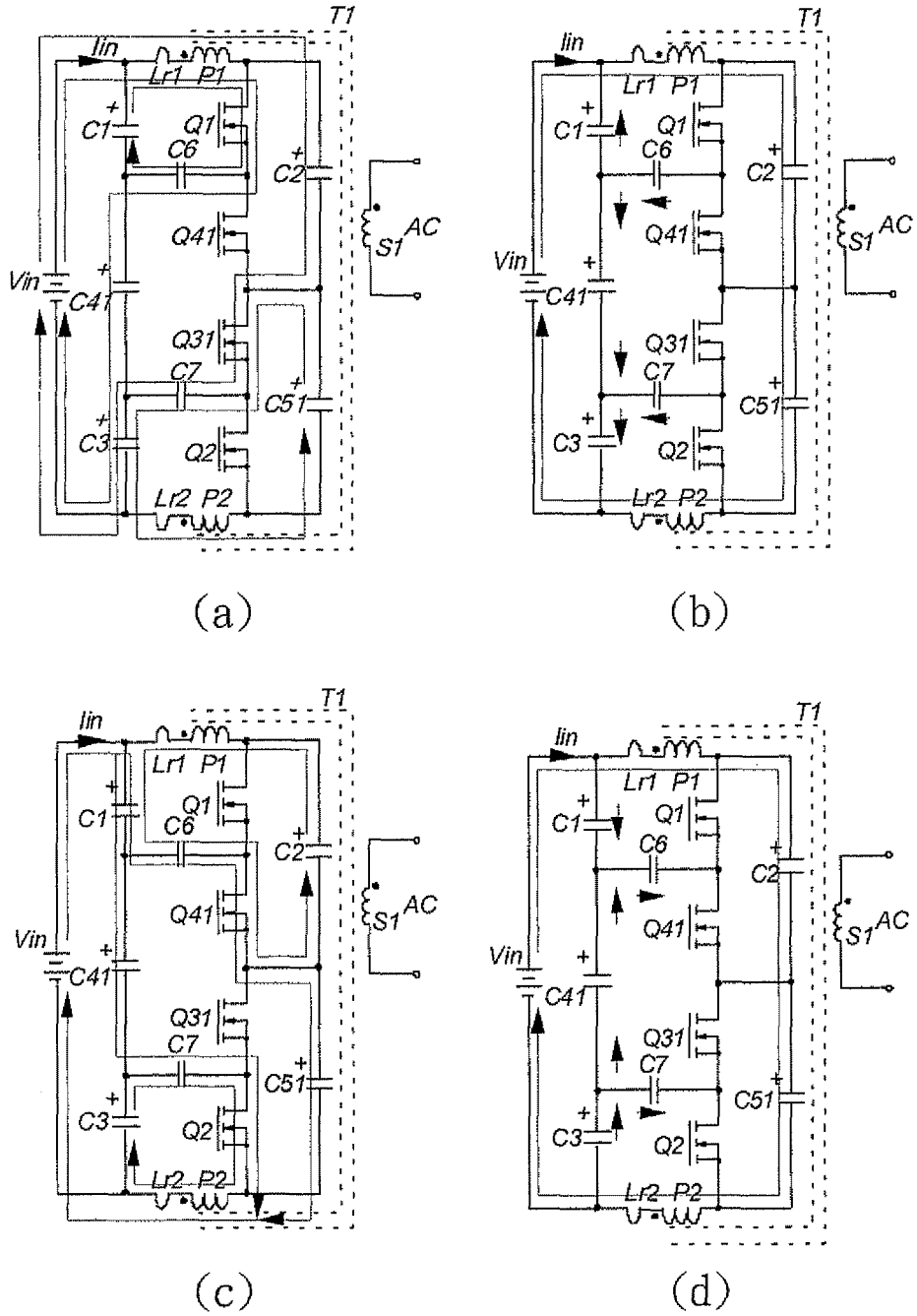
FIG. 12 shows an equivalent circuit of the DC-AC inversion circuit shown in FIG. 11 when the switches are turned on and turned off, respectively.

In accordance with the present invention, a power inversion circuit and its operating stages of another application example of the second embodiment are illustrated in FIG. 11 and FIG. 12, respectively, wherein the power inversion circuit is constructed with one middle-cell and MOSFETs Q1, Q2, Q41, and Q31 shown in FIG. 11 and FIG. 12 (which are equivalent to the switches Q1, Q2, Q4n, and Q3n (i.e. n=1) shown in FIG. 8). When it is assumed that input capacitors C1 and C3 are identical, the voltages across the input capacitors C1 and C3 are equal to one-quarter input voltage Vin. Thus, as shown in FIG. 12(a) to FIG. 12(d), there are four operation stages within one switching cycle during steady-state operation.

As shown in FIG. 12(a), two gate drive signals are issued to turn on the MOSFETs Q1 and Q31 during a first time interval. Voltages (calculated as one-quarter of input voltage minus voltage across the capacitor C6) are provided to the first and second primary windings P1 and P2 via the following routes labeled by the marks of the elements thereof sequentially:
(1) Vin(+)-Lr1-P1-Q1-C6-C41-C3-Vin(−);
(2) Vin(+)-Lr1-P1-C2-Q31-C7-C3-V in(−);
(3) C1(+)-Lr1-P1-Q1-C6-C1(−); and
(4) C51(+)-Q31-C7-C3-Lr2-P2-C51(−),
wherein the clamping capacitors C1 and C51 are discharged while the capacitor C2, C3, C6, C7, and C41 are charged during the first time interval.

As shown in FIG. 12(b), two gate drive signals are issued to turn off the MOSFETs Q1 and Q31 during a second time interval. The clamping capacitors C2 and C51 are charged by the input voltage Vin, and the energies are stored in the leakage inductances of the transformer T1. Due to the opposite polarities of the two primary windings P1 and P2, the voltages across the first and second primary windings P1 and P2 are cancelled each other and the voltages across the clamping capacitors C2 and C51 (assumed C2=C51) are equal to one-half of the input voltage Vin. Due to the leakage energies being absorbed, the voltage waveforms of the MOSFET Q1 and Q31 have no voltage spike and their voltage stresses are limited to one-half of the input voltage Vin. The average voltages across C2, C51 and C41 are equal to one-half input voltage, and the average voltages across C1 and C3 are equal to one-quarter input voltage.

As shown in FIG. 12(c), two gate drive signals are issued to turn on the MOSFETs Q2 and Q41 during a third time interval. Voltages (calculated as one-quarter of input voltage plus voltage across the capacitor C6) are provided to the first and second primary windings P1 and P2 via the following routes labeled by the marks of the elements thereof sequentially:
(1) Vin(+)-C1-C41-C7-Q2-P2-Lr2-Vin(−);
(2) Vin(+)-C1-C6-Q41-C51-P2-Lr2-Vin(−);
(3) C3(+)-C7-Q2-P2-Lr2-C3(−); and
(4) C2(+)-P1-Lr1-C1-C6-Q41-C2(−),
wherein the clamping capacitors C1, C41 and C51 are charged while the capacitor C3, C2, C6 and C7 are discharged during the third time interval.

As shown in FIG. 12(d), two gate drive signals are issued to turn off the second MOSFETs Q2 and Q41. The clamping capacitors C2 and C51 are charged by the input voltage Vin, and the energies are stored in the leakage inductances of the transformer T1. Due to the opposite polarities of the two primary windings P1 and P2, the voltages across the first and second primary windings P1 and P2 are cancelled each other and the voltages across the clamping capacitors C2 and C51 (assumed C2=C51) are equal to one-half of the input voltage Vin. Due to the leakage energies being absorbed, the voltage waveforms of the MOSFET Q2 and Q41 have no voltage spike and their voltage stresses are limited to one-half of the input voltage Vin. The average voltages across C2, C51 and C41 are equal to one-half input voltage, and the average voltages across C1 and C3 are equal to one-quarter input voltage.

Again, as an enhancement of the embodiment, the switches installed in the power inversion circuit may be other active semiconductor switches other than MOSFETs Q1, Q2, Q31 and Q41 shown in FIG. 11.

Figure 13:
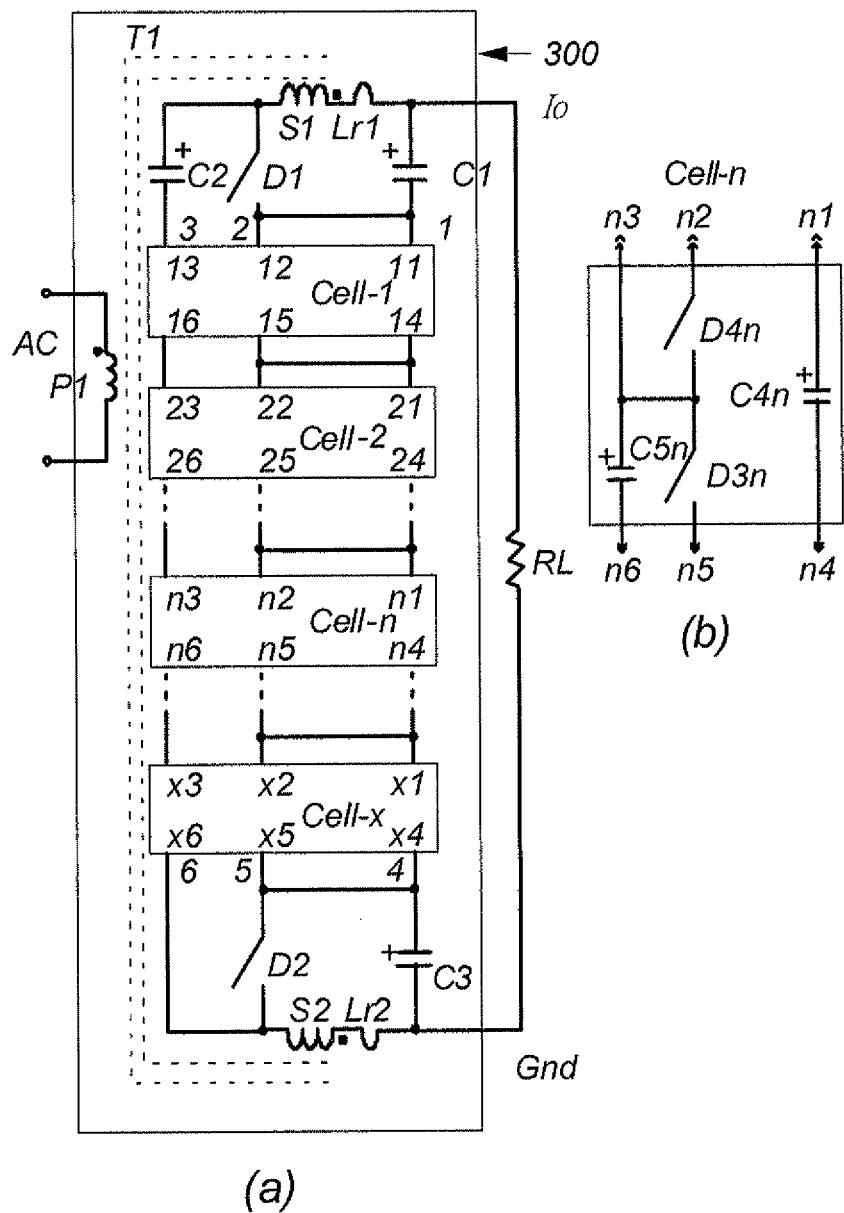
FIG. 13(a) and FIG. 13(b) are a circuit diagram and a sub-circuit of a nth middle cell Cell-n of an AC-DC rectification circuit according to a third embodiment of the present invention.

The first embodiment of the present invention can be extended its function from an inversion circuit to a rectifier circuit 300 as a third embodiment of the present invention shown in FIG. 13. Instead of obtaining near zero input current-ripple of the power inversion circuit of the present invention, the rectifier circuit of the present invention has near zero output current-ripple performance.

As shown, the rectifier circuit 300 is used to convert AC voltage received from a primary winding P1 of a transformer T1 to a DC voltage outputted to a load RL, and is paralleled-connected with the load RL and comprises one top-cell (having four terminals labeled as Io, 1, 2, and 3), several middle-cells (wherein nth middle-cell is labeled as Cell-n and has six terminals n1, n2, n3, n4, n5 and n6) and one bottom-cell (having four terminals labeled as GND, 4, 5 and 6) series-connected sequentially.

The top-cell comprises two clamping capacitors C1 and C2, one inductor Lr1, a first secondary winding S1 and one switch D1. The inductor Lr1 represents the leakage inductance of the first secondary winding S1 or an external inductor. Terminal Io of the top-cell is connected to a positive node of the load RL. A first node of the clamping capacitor C1 and a first node of the inductor Lr1 are connected to the terminal Io. A second node of the inductor Lr1 is connected to a dot node of the first secondary winding S1. An un-dotted node of the first secondary winding S1 is connected to a top node of the switch D1 and a first node of the clamping capacitor C2. A second node (i.e. the terminal 1) of the clamping capacitor C1 and a bottom node (i.e. the terminal 2) of the switch D1 are connected together. The terminals 1 and 2 are also connected to terminals 11 and 12 of a first middle-cell Cell-1, respectively. A second node (i.e. the terminal 3) of the clamping capacitor C2 is connected to terminal 13 of the first middle-cell Cell-1.

The bottom-cell comprises one clamping capacitor C3, one inductor Lr2, a second secondary winding S2, and one switch D2. The inductor Lr2 represents the leakage inductance of the second primary winding P2 or an external inductor. The terminal GND of the bottom-cell is connected to a negative node of the load RL. A second node of the clamping capacitor C3 and a first node of the inductor Lr2 are connected to the terminal GND. A second node of the inductor Lr2 is connected to a dot node of the second secondary winding S2. An un-dotted node (i.e. the terminal 6) of the second secondary winding S2 is connected to a bottom node of the switch D2. A first node (i.e. the terminal 4) of the clamping capacitor C3 and the top node (i.e. the terminal 5) of the switch D2 are connected together. The terminals 4, 5 and 6 are connected to terminals x4, x5 and x6 of a last middle-cell Cell-x, respectively.

As shown in FIG. 13(a), several middle-cells Cell-1~Cell-x can be connected in series between the top-cell and the bottom-cell to reduce the voltage stress on switches. As referring to FIG. 13(b), the nth middle-cell Cell-n is realized by two clamping capacitors C4n and C5n, and two switches D3n and D4n. Terminals n1 and n2 of the nth middle-cell Cell-n are connected to a first node of the clamping capacitor C4n and a top node of the switch D4n, respectively. Terminal n3 of the nth middle-cell Cell-n is connected to a bottom node of the switch D4n, a top node of the switch D3n, and a first node of the clamping capacitor C5n. Terminals n4, n5 and n6 of the nth middle-cell Cell-n are connected to a second node of the clamping capacitor C4n, a bottom node of the switch D3n, and a second node of the clamping capacitor C5n, respectively.

The terminals 111, n2, and n3 of the nth middle-cell Cell-n are connected to terminals (n−1)4, (n−1)5, (n−1)6 of a previous middle-cell Cell-(n−1), respectively. Moreover, the terminals n4, n5, and n6 of the nth middle-cell Cell-n are connected to terminals (n+1)1, (n+1)2, (n+1)3 of a next middle-cell Cell-(n+1), respectively. If two or more middle-cells are connected in series between the top-cell and bottom-cell, the terminals n4 and n5 of the nth middle-cell Cell-n are connected together except terminals x4 and x5 of the last middle-cell Cell-x.

As shown, a transformer T1 provided in the rectifier circuit 300 includes the two secondary windings S1 and S2 each having identical turns, and at least one primary winding P1. The inductors Lr1 and Lr2 represent the leakage inductance of the two secondary windings S1 and S2 or two separate inductors or a two-winding couple inductor.

Figure 14:
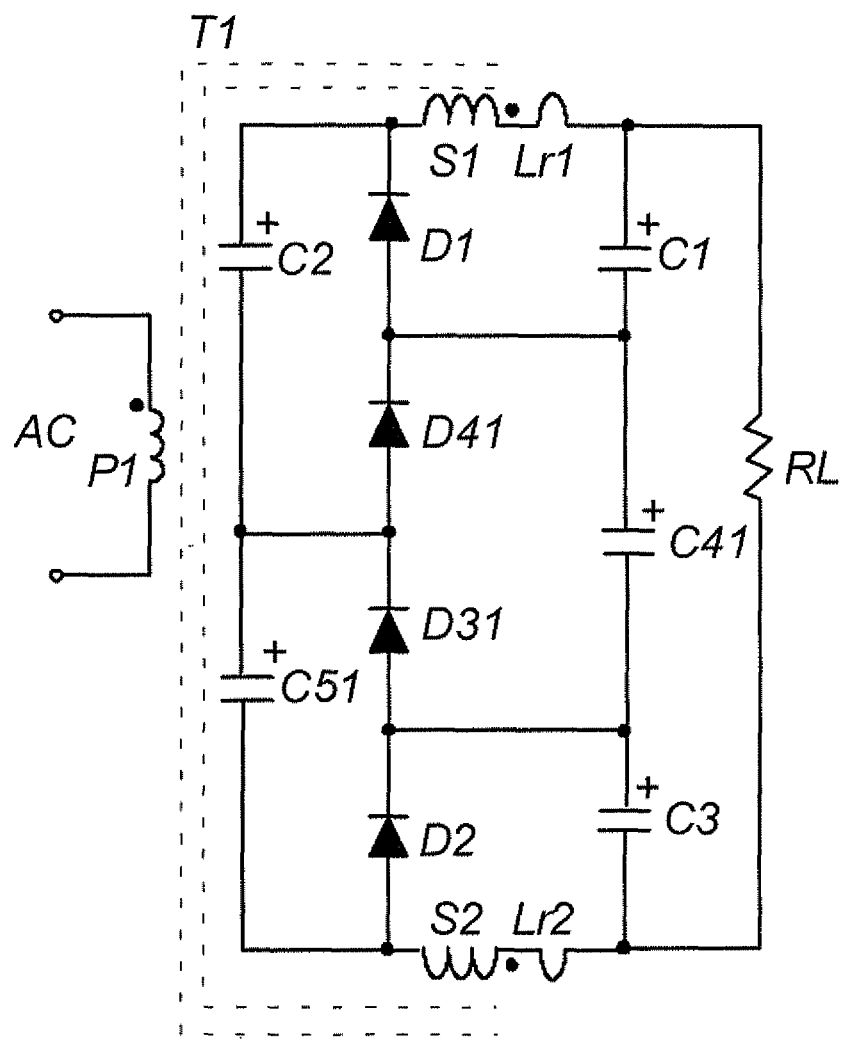
FIG. 14 is a circuit diagram showing an example of the AC-DC rectification circuit shown in FIG. 13, wherein the circuit is realized with one middle-cell.
Figure 15:
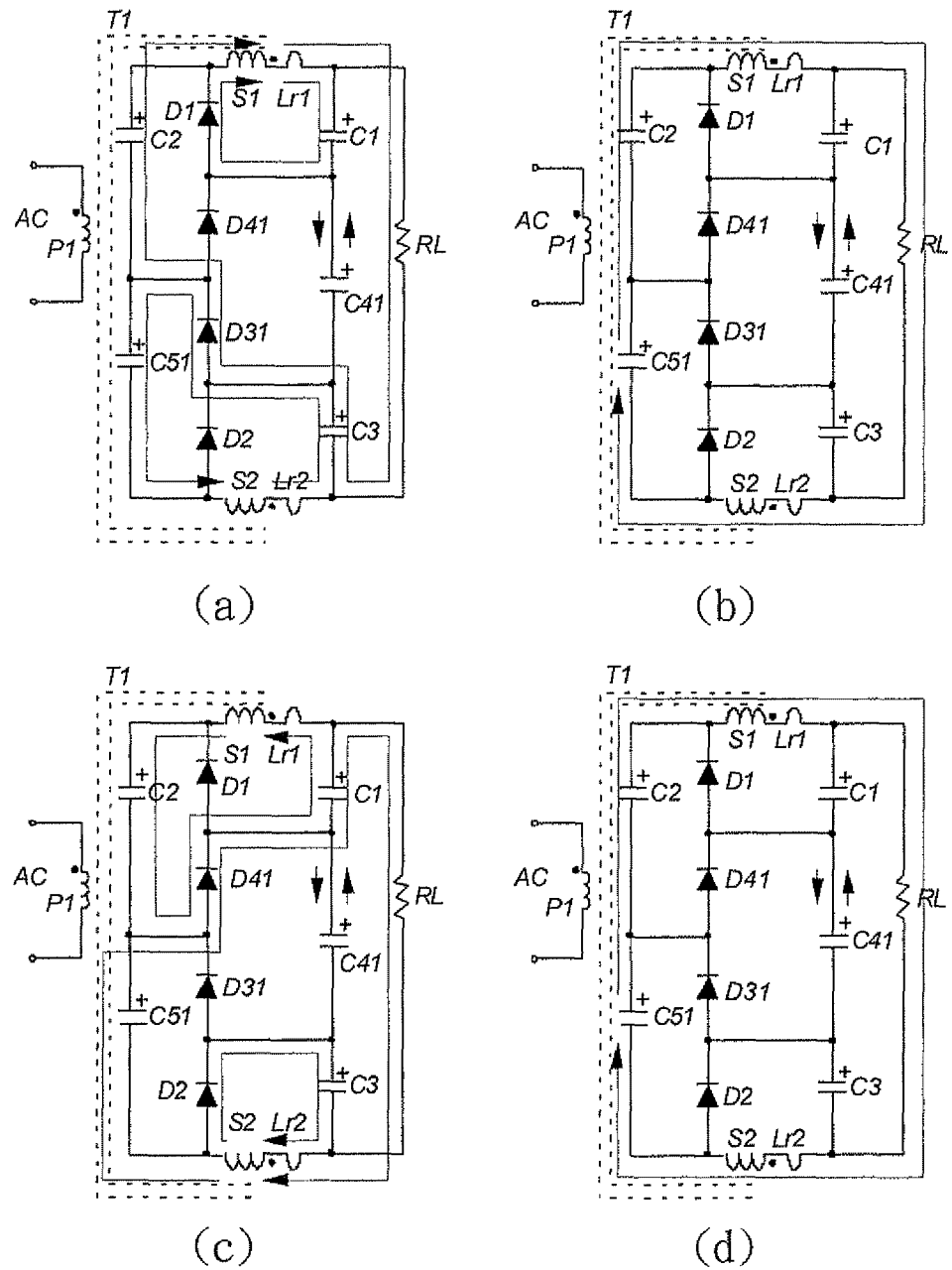
FIG. 15 shows an equivalent circuit of the AC-DC rectification circuit shown in FIG. 14 when the rectifiers are turned on and turned off, respectively.

In accordance with the present invention, one embodiment of the rectifier circuit and its operating stages are illustrated as shown in FIG. 14 and FIG. 15, respectively. As an application example, the rectifier circuit is constructed with only one middle-cell and diodes D1, D2, D41, and D31 shown in FIG. 14 and FIG. 15 (which are equivalent to the switches D1, D2, D4n, and D3n (i.e. n=1) shown in FIG. 13). Assumed the clamping capacitors C2 and C51 are identical so that the voltage of each capacitor is equal to one-half output voltage.

The input voltage produced by the primary winding P1 of the transformer T1 is coupled to the first and second secondary windings S1 and S2 to generate an AC voltage. Thus, as shown in FIG. 15(a) to FIG. 15(d), the diodes D1 and D2 are forward-biased to be turned on and reversed-biased to be turned off alternatively. There are four operation stages within one switching cycle during steady-state operation.

As shown in FIG. 15(a), the diodes D1 and D11 are forward biased by the first and second secondary windings S1 and S2 during a first time interval. The first and second secondary windings S1 and S2 charge and discharge the capacitors via the following routes labeled by the marks of the elements thereof sequentially:
(1) S1(*dot*)-Lr1-C1-D1-S1(non-dot);
(2) S1(*dot*)-Lr1-RL-C3-D31-C2-S1(non-dot); and
(3) S2(*dot*)-Lr2-C3-D31-C51-S2(non-dot),
wherein the capacitors C1 and C51 are charged while the capacitors C3 and C2 are discharged during the first time interval.

As shown in FIG. 15(b), the diodes D1 and D11 are reversed biased by the first and second secondary windings S1 and S2 during a second time interval. The clamping capacitors C2 and C51 are discharged to the output voltage. Due to the opposite polarities of the two secondary windings S1 and S2, the voltages across the first and second secondary windings S1 and S2 are cancelled each other and the voltages across the clamping capacitors C2 and C51 are equal to the output voltage. Due to the leakage energies being absorbed, the voltage waveforms of the diodes D1 and D31 have no voltage spike and their voltage stresses are limited to one-half of the output voltage. The average voltages across C2, C51 and C41 are equal to one-half output voltage, and the average voltages across C1 and C3 are equal to one-quarter output voltage.

As shown in FIG. 15(c), the diodes D2 and D41 are forward biased by the first and second secondary windings S1 and S2 during a third time interval. The two secondary windings S1 and S2 charge and discharge the capacitors via the following routes labeled by the marks of the elements thereof sequentially:
(1) S1(non-dot)-C2-D41-C1-Lr1-S1(*dot*);
(2) S2(non-dot)-C51-D41-C1-RL-Lr2-S2(*dot*); and
(3) S2(non-dot)-D2-C3-Lr2-S2(*dot*),
wherein the capacitors C1 and C51 are discharged while the capacitors C3 and C2 are charged during the third time interval.

As shown in FIG. 15(d), the diodes D2 and D41 are reversed biased by the first and second secondary windings S1 and S2 during a fourth time interval. The clamping capacitors C2 and C51 are discharged to the output voltage. Due to the opposite polarities of the two secondary windings S1 and S2, the voltages across the first and second secondary windings S1 and S2 are cancelled each other and the voltages across the clamping capacitors C2 and C51 are equal to output voltage. Due to the leakage energies being absorbed, the voltage waveforms of the diodes D2 and D41 have no voltage spike and their voltage stresses are limited to one-half of the output voltage. The average voltages across C2, C51 and C41 are equal to one-half output voltage, and the average voltages across C1 and C3 are equal to one-quarter output voltage.

In the embodiment of FIG. 13, the diodes D1, D2, D41 and D31 are used as rectifiers. However, as an enhancement of the embodiment to improve the efficiency, the rectifiers may be, for example, synchronous rectifiers or a combination of diode and synchronous rectifier.

Figure 16:
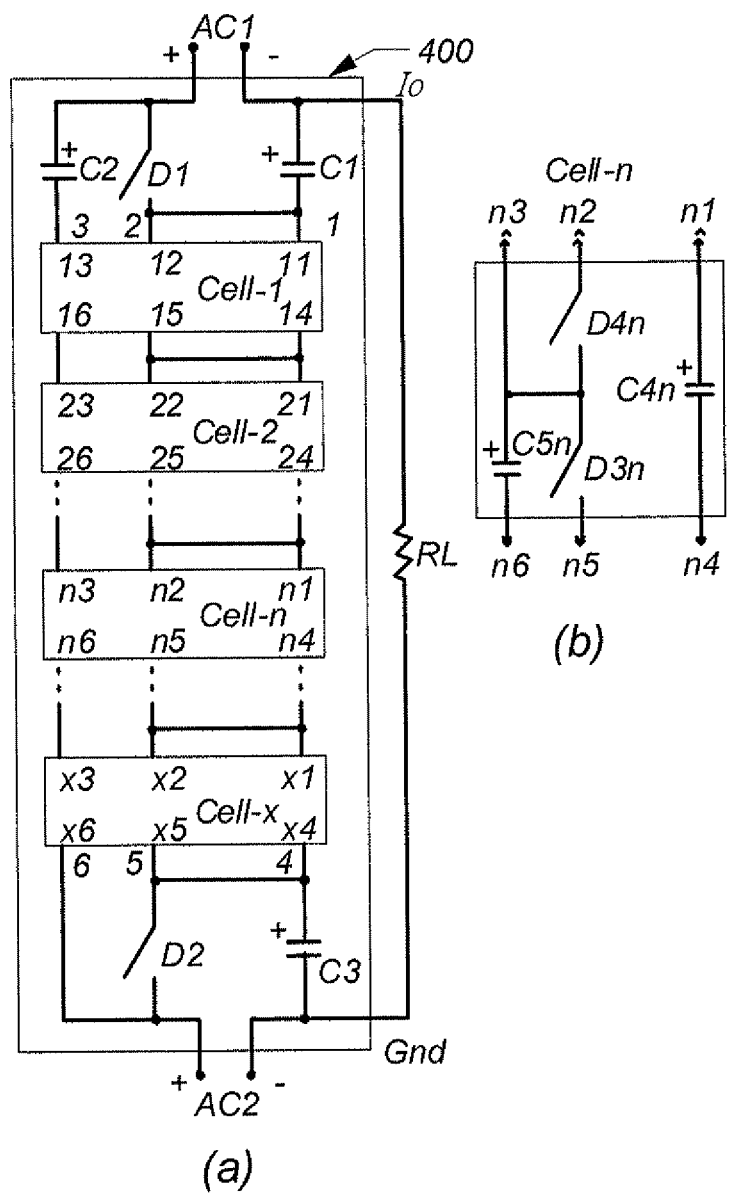
FIG. 16 is a circuit diagram and a sub-circuit of a nth middle-cell Cell-n of an AC-DC rectification circuit according to a fourth embodiment of the present invention.

The fourth embodiment of the present invention shown in FIG. 16 is a rectifier circuit 400 derived from the modification of the third embodiment of the present invention shown in FIG. 13, wherein two isolated identical amplitude and timing clock pulse trains (i.e. a first clock pulse train AC1 and a second clock pulse train AC2) are used to replace the first and second secondary windings S1 and S2 in the third embodiment of the present invention. The rectifier circuit 400 comprises one top-cell (having five terminals labeled as AC1(+), AC1(−), 1, 2 and 3), several middle-cells (wherein nth middle-cell is labeled as Cell-n and has six terminals labeled as n1, n2, n3, n4, n5 and n6) and one bottom-cell (having five terminals labeled as AC2(+), AC2(−), 4, 5 and 6) series-connected sequentially.

As referring to FIG. 16, the top-cell comprises two clamping capacitors C1 and C2, and one switch DL A first clock pulse train (not shown) is connected to the terminals AC1(+) and AC1(−). Terminal AC1(−) of the top-cell is connected to a positive node of the load RL. A first node of the clamping capacitor C1 is connected to the terminal AC1(−) while a top node of the switch D1 and a first node of the clamping capacitor C2 are connected to the terminal AC1(+). A second node (i.e. the terminal 1) of the clamping capacitor C1 and a bottom node (i.e. the terminal 2) of the switch D1 are connected together. The terminals 1 and 2 are also connected to terminals 11 and 12 of a first middle-cell Cell-1, respectively. A second node (i.e. the terminal 3) of the clamping capacitor C2 is connected to terminal 13 of the first middle-cell Cell-1.

The bottom-cell comprises one clamping capacitor C3, and one switch D2. A second clock pulse train (not shown) is connected to the terminals AC2(+) and AC2(−). Terminal AC2(−) of the bottom-cell is connected to a negative node of the load RL. A second node of the clamping capacitor C3 is connected to the terminal AC1(−) while a bottom node of the switch D2 and the terminal 6 are connected to the terminal AC1(+). A first node (i.e. the terminal 4) of the clamping capacitor C3 and a top node (i.e. the terminal 5) of the switch D2 are connected together. The terminals 4, 5 and 6 are connected to terminals x4, x5 and x6 of a last middle-cell Cell-x, respectively.

As shown in FIG. 16(a), several middle-cells Cell-1~Cell-x can be connected in series between the top-cell and the bottom-cell to reduce the voltage stress on switches. As referring to FIG. 16(b), the nth middle-cell Cell-n is realized by two clamping capacitors C4n and C5n, and two switches D3n and D4n. Terminals n1 and n2 of the nth middle-cell Cell-n are connected to a first node of the clamping capacitor C4n and a top node of the switch D4n, respectively. Terminal n3 of the nth middle-cell Cell-n is connected to a bottom node of the switch D4n, a top node of the switch D3n, and a first node of the clamping capacitor C5n. Terminals n4, n5 and n6 of the nth middle-cell Cell-n are connected to a second node of the clamping capacitor C4n, a bottom node of the switch D3n, and a second node of the clamping capacitor C5n, respectively.

The terminals n1, n2, and n3 of the nth middle-cell Cell-n are connected to terminals (n−1)4, (n−1)5, (n−1)6 of a previous middle-cell Cell-(n−1), respectively. Moreover, the terminals n4, n5, and n6 of the nth middle-cell Cell-n are connected to terminals (n+1)1, (n+1)2, (n+1)3 of a next middle-cell Cell-(n+1), respectively. If two or more middle-cells are connected in series between the top-cell and bottom-cell, the terminals n4 and n5 of the nth middle-cell Cell-n are connected together except terminals x4 and x5 of the last middle-cell Cell-x.

Figure 17:
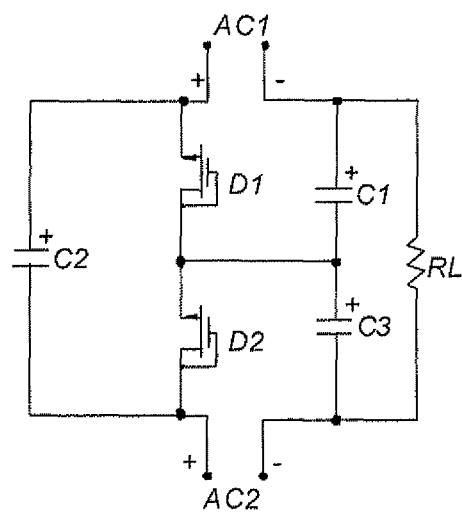
FIG. 17 is a circuit diagram showing an example of the AC-DC rectification circuit shown in FIG. 16, wherein the circuit is realized without middle-cell.

In accordance with the fourth embodiment of the rectifier circuit 400, an application example is illustrated as shown in FIG. 17 and is constructed without having middle-cell, wherein two MOSFETs D1 and D2 are wired to behave as the switches D1 and D2 shown in FIG. 16. To behave as the secondary windings, the operation stages with two identical AC clock pulse trains are the same as that of the rectifier circuit shown in the FIG. 16.

Figure 18:
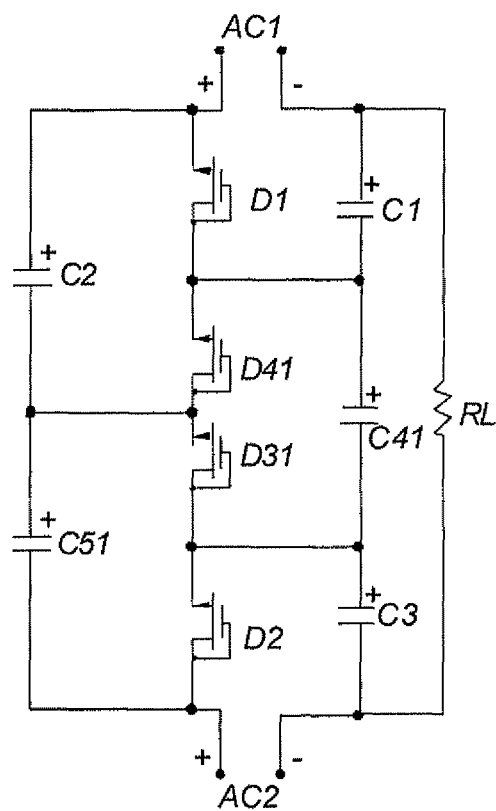
FIG. 18 is a circuit diagram showing an example of the AC-DC rectification circuit shown in FIG. 16, wherein the circuit is realized with one middle-cell.

In accordance with the fourth embodiment of the rectifier circuit 400, another application example is illustrated as shown in FIG. 18 and is constructed with only one middle-cell, wherein four MOSFETs D1, D41, D31 and D2 are wired to behave as the switches D1, D4n, D3n and D2 shown in FIG. 16. To behave as the secondary windings, the operation stages with two identical AC clock pulse trains are the same as that of the rectifier circuit shown in the FIG. 16.

In the embodiments shown herein, the switching functions can be performed by any suitable devices known in the art, or later developed. In the preferred first and second embodiments, field-effect transistors are used, however the power inversion circuits may also use other appropriate switch devices such as bipolar transistors, IGBTs, or even electromechanical switch. The rectifier diodes in the rectifier circuits of the third and fourth embodiments of the present invention, other appropriate switch devices such as field-effect transistors, bipolar transistors, IGBTs, or even electromechanical switch may be used instead.

Although the embodiments of the present invention are disclosed to be key part of the power inversion circuits. However, it can be combined with topologies of the prior art. For instance, the rectification by the embodiment of the present invention and the inversion may be performed by a topology of the prior art, or vise versa. Furthermore, both the inversion and rectification can be performed by the techniques disclosed herein.

While the invention has been described in detail herein, in accordance with certain preferred embodiments, thereof, many modifications and changes thereto may be affected by those skilled in the art. Accordingly, it is intended by the appended claims to cover all such modifications and changes as fall within the true concept and scope of the invention.

What is claimed is:

1. A power inversion circuit for converting a DC voltage received at a DC input to an AC voltage, which is paralleled-connected with the DC input and includes:
    a top-cell comprising a first clamping capacitor, a second clamping capacitor, a first switch, and a first inductor and a first primary winding connected in series between a first node of the first clamping capacitor and a top node of the first switch, wherein a first node of the second clamping capacitor and the top node of the first switch are connected together;
    a bottom-cell comprising a third clamping capacitor and a second switch, and a second inductor and a second primary winding connected in series between a second node of the third clamping capacitor and a bottom node of the second switch;
    a transformer includes the first and second primary windings and at least one secondary winding, wherein the first and second primary windings each has identical turns; and
    at least one middle-cell connected in series between the top and bottom cells and each comprising a fourth clamping capacitor, a fifth clamping capacitor, a third switch and a fourth switch; wherein the third and fourth switches are connected in series; when there is one middle-cell, a top node of the fourth switch is connected to a bottom node of the first switch, the first node of the fourth clamping capacitor is connected to a second node of the first clamping capacitor, a first node of the fifth clamping capacitor is connected to a second node of the second clamping capacitor and a node between the third and fourth switches, respectively, and a second node of the fourth clamping capacitor, a bottom node of the third switch and a second node of the fifth clamping capacitor are connected to the first node of the third clamping capacitor, a top node of the second switch and the bottom node of the second switch, respectively;
    thereby, when the switches are turned on or off alternatively within one switching cycle, the AC voltage is generated at an output by the secondary winding and a near zero input-current ripple with low voltage stress on the switches is performed.

2. The power inversion circuit of claim 1 wherein, when there are more than one middle-cell, a top node of the fourth switch of the first middle cell is connected to a bottom node of the first switch, the first node of the fourth clamping capacitor of the first middle cell is connected to a second node of the first clamping capacitor, a first node of the fifth clamping capacitor of the first middle cell is connected to a second node of the second clamping capacitor and a node between the third and fourth switches of the first middle-cell, respectively; a second node of the fourth clamping capacitor, a bottom node of the third switch and a second node of the fifth clamping capacitor of the first middle cell are connected to a first node of the fourth clamping capacitor, a top node of the fourth switch and a first node of the fifth clamping capacitor of the next middle-cell; and a second node of the fourth clamping capacitor, a bottom node of the third switch and a second node of the fifth clamping capacitor of the last middle-cell are connected to the first node of the third clamping capacitor, a top node of the second switch and the bottom node of the second switch, respectively; and the second node of the fourth clamping capacitor and the bottom node of the third switch of the middle-cells other than the last middle-cell are connected together.

3. The power inversion circuit of claim 2, wherein the first and second inductors represent the leakage inductance of the first and second primary windings, two external inductors, or a two-winding couple inductor.

4. The power inversion circuit of claim 3, wherein the second node of the first clamping capacitor and the bottom node of the first switch are connected together, and the first node of the third clamping capacitor and the top node of the second switch are connected together.

5. The power inversion circuit of claim 3, wherein the second node of the first clamping capacitor and the bottom node of the first switch are connected together via a sixth clamping capacitor, and the first node of the third clamping capacitor and the top node of the second switch are connected together via a seventh clamping capacitor.

6. A power inversion circuit for converting a DC voltage received at a DC input to an AC voltage, which is paralleled-connected with the DC input and includes:
a top cell comprising a first clamping capacitor, a second clamping capacitor, a sixth clamping capacitor, a first switch, and a first inductor and a first primary winding connected in series between a first node of the first clamping capacitor and a top node of the first switch, wherein a first node of the second clamping capacitor and the top node of the first switch are connected together, and the second node of the first clamping capacitor and the bottom node of the first switch are connected together via the sixth clamping capacitor;
a bottom cell comprising a third clamping capacitor and a second switch, and a second inductor and a second primary winding connected in series between a second node of the third clamping capacitor and a bottom node of the second switch; wherein the first node of the third clamping capacitor, the top node of the second switch and a bottom node of the second switch are connected to a second node of the first clamping capacitor, a bottom node of the first switch and a second node of the second clamping capacitor, respectively; and
a transformer includes the first and second primary windings and at least one secondary winding, wherein the first and second primary windings each has identical turns;
thereby, when the switches are turned on or off alternatively within one switching cycle, the AC voltage is generated at an output by the secondary winding and a near zero input-current ripple with low voltage stress on the switches is performed.

7. The power inversion circuit of claim 6, wherein the first and second inductors represent the leakage inductance of the first and second primary windings, two external inductors, or a two-winding couple inductor.

8. A power rectifier circuit for converting an AC voltage received at a primary winding of a transformer to a DC voltage outputted to a load, which is paralleled-connected with the load and includes:
a top cell comprising a first clamping capacitor, a second clamping capacitor, a first switch, and a first inductor and a first secondary winding connected in series between a first node of the first clamping capacitor and a top node of the first switch, wherein a first node of the second clamping capacitor and the top node of the first switch are connected together, and a second node of the first clamping capacitor and the bottom node of the first switch are connected together;
a bottom cell comprising a third clamping capacitor and a second switch, and a second inductor and a second secondary winding connected in series between a second node of the third clamping capacitor and a bottom node of the second switch, wherein a first node of the third clamping capacitor and a top node of the second switch are connected together;
a transformer includes the first and second secondary windings and at least one primary winding, wherein the first and second secondary windings each has identical turns; and
at least one middle cell connected in series between the top and bottom cells and each comprising a fourth clamping capacitor, a fifth clamping capacitor, a third switch and a fourth switch; wherein the third and fourth switches are connected in series; when there is one middle cell, a top node of the fourth switch is connected to a bottom node of the first switch, the first node of the fourth clamping capacitor is connected to a second node of the first clamping capacitor, a first node of the fifth clamping capacitor is connected to a second node of the second clamping capacitor and a node between the third and fourth switches, respectively, and a second node of the fourth clamping capacitor, a bottom node of the third switch and a second node of the fifth clamping capacitor are connected to the first node of the third clamping capacitor, the top node of the second switch and a bottom node of the second switch, respectively;
thereby, when the switches are turned on or off alternatively within one switching cycle, the DC voltage is generated by the secondary windings and a near zero output-current ripple with low voltage stress on the switches is performed.

9. The power rectifier circuit of claim 8 wherein, when there are more than one middle cell, a top node of the fourth switch of the first middle cell is connected to a bottom node of the first switch, the first node of the fourth clamping capacitor of the first middle cell is connected to a second node of the first clamping capacitor, a first node of the fifth clamping capacitor of the first middle cell is connected to a second node of the second clamping capacitor and a node between the third and fourth switches of the first middle cell, respectively; a second node of the fourth clamping capacitor, a bottom node of the third switch and a second node of the fifth clamping capacitor of the first middle cell are connected to a first node of the fourth clamping capacitor, a top node of the fourth switch and a first node of the fifth clamping capacitor of the next middle cell; and a second node of the fourth clamping capacitor, a bottom node of the third switch and a second node of the fifth clamping capacitor of the last middle cell are connected to the first node of the third clamping capacitor, the top node of the second switch and a bottom node of the second switch, respectively; and the second node of the fourth clamping capacitor and the bottom node of the third switch of the middle-cells other than the last middle-cell are connected together.

10. The power rectifier circuit of claim 9, wherein the first and second inductors represent the leakage inductance of the first and second secondary windings, two external inductors, or a two-winding couple inductor.

11. A power rectifier circuit for converting an AC voltage to a DC voltage outputted to a load, which is paralleled-connected with the load and includes:
　a top cell comprising a first clamping capacitor, a second clamping capacitor, a first switch, wherein a first clock pulse train is connected between a first node of the first clamping capacitor and a top node of the first switch, a first node of the second clamping capacitor and the top node of the first switch are connected together, and a second node of the first clamping capacitor and a bottom node of the first switch are connected together;
　a bottom cell comprising a third clamping capacitor and a second switch, wherein a second clock pulse train is connected between a second node of the third clamping capacitor and a bottom node of the second switch, and a first node of the third clamping capacitor and a top node of the second switch are connected together; and
　at least one middle cell connected in series between the top and bottom cells and each comprising a fourth clamping capacitor, a fifth clamping capacitor, a third switch and a fourth switch; wherein the third and fourth switches are connected in series; when there is one middle cell, a top node of the fourth switch is connected to a bottom node of the first switch, the first node of the fourth clamping capacitor is connected to a second node of the first clamping capacitor, a first node of the fifth clamping capacitor is connected to a second node of the second clamping capacitor and a node between the third and fourth switches, respectively, and a second node of the fourth clamping capacitor, a bottom node of the third switch and a second node of the fifth clamping capacitor are connected to the first node of the third clamping capacitor, the top node of the second switch and a bottom node of the second switch, respectively;
　thereby, when the switches are turned on or off alternatively within one switching cycle, the DC voltage is generated by the clock pulse trains and a near zero output-current ripple with low voltage stress on the switches is performed.

12. The power rectifier circuit of claim 11 wherein, when there are more than one middle cell, a top node of the fourth switch of the first middle cell is connected to a bottom node of the first switch, the first node of the fourth clamping capacitor of the first middle cell is connected to a second node of the first clamping capacitor, a first node of the fifth clamping capacitor of the first middle cell is connected to a second node of the second clamping capacitor and a node between the third and fourth switches of the first middle cell, respectively; a second node of the fourth clamping capacitor, a bottom node of the third switch and a second node of the fifth clamping capacitor of the first middle cell are connected to a first node of the fourth clamping capacitor, a top node of the fourth switch and a first node of the fifth clamping capacitor of the next middle cell; respectively, and a second node of the fourth clamping capacitor, a bottom node of the third switch and a second node of the fifth clamping capacitor of the last middle cell are connected to the first node of the third clamping capacitor, the top node of the second switch and a bottom node of the second switch, respectively, and the second node of the fourth clamping capacitor and the bottom node of the third switch of the middle-cells other than the last middle-cell are connected together.

13. The power rectifier circuit of claim 12, wherein the first and second clock pulse trains are identical with each other in amplitude and timing.

14. A power rectifier circuit for converting an AC voltage to a DC voltage outputted to a load, which is paralleled-connected with the load and includes:
　a top cell comprising a first clamping capacitor, a second clamping capacitor, a first switch, wherein a first clock pulse train is connected between a first node of the first clamping capacitor and a top node of the first switch, a first node of the second clamping capacitor and the top node of the first switch are connected together, and a second node of the first clamping capacitor and a bottom node of the first switch are connected together; and
　a bottom cell comprising a third clamping capacitor and a second switch, wherein a second clock pulse train is connected between a second node of the third clamping capacitor and a bottom node of the second switch while the bottom node of the second switch is connected to a second node of the second clamping capacitor, and a first node of the third clamping capacitor and a top node of the second switch are connected to a second node of the first clamping capacitor and a bottom node of the first switch, respectively;
　thereby, when the switches are turned on or off alternatively within one switching cycle, the DC output voltage is generated by the clock pulse trains and near zero output-current ripple with low voltage stress on the switches is performed.

15. The power rectifier circuit of claim 14, wherein the first and second clock pulse trains are identical with each other in amplitude and timing.

* * * * *